United States Patent [19]
McElroy et al.

[11] Patent Number: 6,055,373
[45] Date of Patent: Apr. 25, 2000

[54] COMPUTER SYSTEM INCLUDING A DIGITAL SIGNAL PROCESSOR AND CONVENTIONAL CENTRAL PROCESSING UNIT HAVING EQUAL AND UNIFORM ACCESS TO COMPUTER SYSTEM RESOURCES

[75] Inventors: Jeffrey F. McElroy, Columbia; Jimmy D. Pike, Lexington, both of S.C.

[73] Assignee: NCR Corporation, Dayton, Ohio

[21] Appl. No.: 08/846,194

[22] Filed: Apr. 28, 1997

[51] Int. Cl.[7] .................................................. H01J 3/00
[52] U.S. Cl. .......................... 395/800.35; 395/800.35; 395/800.28; 395/309; 395/308; 395/728
[58] Field of Search ..................... 395/800.35, 800.28, 395/309, 308, 728, 729; 712/35, 28; 710/129, 128, 241, 240; 711/144, 145, 119, 120, 130, 153

[56] References Cited

U.S. PATENT DOCUMENTS

| | | | |
|---|---|---|---|
| 4,905,145 | 2/1990 | Sauber | 395/800.28 |
| 5,291,614 | 3/1994 | Baker et al. | 395/800 |
| 5,511,219 | 4/1996 | Shimony et al. | 395/800 |
| 5,513,374 | 4/1996 | Baji | 395/846 |
| 5,550,988 | 8/1996 | Sarangdhar et al. | 710/43 |
| 5,611,058 | 3/1997 | Moore et al. | 395/309 |
| 5,619,728 | 4/1997 | Jones et al. | 395/847 |
| 5,761,516 | 6/1998 | Rostoker et al. | 395/733 |
| 5,784,599 | 7/1998 | Elkhoury | 395/556 |
| 5,809,536 | 9/1998 | Young et al. | 711/144 |

*Primary Examiner*—Larry D. Donaghue
*Attorney, Agent, or Firm*—James M. Stover

[57] ABSTRACT

A digital processing system including a central processing unit (CPU) and a digital signal processor (DSP) is optimized for digital signal processing applications, providing the central processing unit and digital signal processor with equal access to system resources such as system memory and connected I/O devices. The digital processing system includes two high-performance processor busses: one processor bus providing connection for one to four CPUs; the other processor bus providing connection for up to four DSPs. An advanced multi-ported memory controller interconnects the two processor busses with system memory and a system I/O bus, providing the CPUs and DSPs with equal and uniform access to all system memory and I/O resources.

7 Claims, 2 Drawing Sheets

COMPUTER SYSTEM INCLUDING A DIGITAL SIGNAL PROCESSOR AND CONVENTIONAL CENTRAL PROCESSING UNIT HAVING EQUAL AND UNIFORM ACCESS TO COMPUTER SYSTEM RESOURCES

The present invention relates to digital system processors and, more particularly, to a computer system providing improved digital signal processor access to computer system resources.

BACKGROUND OF THE INVENTION

A digital signal processor (DSP) is a special purpose processor designed for high speed data acquisition and manipulations such as multiplies, adds and subtracts. These high speed functions are required to perform the mathematically intensive and real time operations required to digitize and process speech, music, video, telephone and electromechanical signals. Some common applications for digital signal processing include the telephone modem and PC multimedia.

In a typical computer system including digital signal processing, digital signal processors are dedicated slaves that perform signal processing tasks. Most systems create specialized areas of memory or dedicate input devices whose access is restricted and under very tight control of the system central processor units (CPUs). An example of such a system is illustrated in FIG. 1.

FIG. 1 provides a simple block diagram of a symmetric multiprocessing (SMP) computer system employing currently available commodity components. The design shown employs Intel Pentium Pro™ processors and a high-performance bus and chipset, such as an Intel P6 bus and 8245GX chipset. The system as shown in FIG. 1 includes up to four CPUs 101 connected to a high-bandwidth split-transaction bus 103. A system memory 105 is connected to bus 103 through a memory controller 107. Connection to one or more DSPs 112 or other standard PCI devices is provided through PCI I/O interfaces 109. As stated above, all of these components are currently available commodity components.

The present invention relates to a computer system wherein the digital signal processors and conventional central processing units (CPUs) have equal and uniform access to all system resources.

Integrated data processing/DSP systems including a shared internal bus for transferring both instructions and data are known in the art as evidenced by the U.S. Pat. No. 5,511,219 to Shimony et al. As disclosed therein, a general purpose CPU is connected to the shared bus for retrieving instructions, and a DSP module is connected with the bus for processing an externally provided digital signal by executing DSP command list instructions. The execution of command list instructions by the DSP is independent of the execution of general purpose instructions by the CPU. However, the mapping of DSP memory and execution of CPU and DSP instructions is controlled by the CPU.

Also known in the art is a digital signal processor subsystem that is connected to a plurality of application specific hardware devices as described in the Baker et al U.S. Pat. No. 5,291,614. A single DSP concurrently handles a plurality of different signal processing functions on a real-time basis. While the prior devices operate satisfactorily, they do not provide the versatility available with a plurality of DSPs and CPUs which have equal and uniform access to all system resources. The present invention was developed to accommodate these needs.

OBJECTS OF THE INVENTION

It is therefore an object of the present invention to provide a new and useful method and apparatus for performing digital signal processing within a computer system.

It is another object of the present invention to provide such a new and useful arrangement for a computer system including a conventional central processor unit and a digital signal processor having equal and uniform access to all computer system resources.

SUMMARY OF THE INVENTION

There is provided, in accordance with the present invention, a digital processing system having a central processing unit (CPU) and a digital signal processor (DSP) and providing the CPU and DSP with equal and uniform access to system memory and other system resources. The digital processing system comprises a first processor bus; at least one central processing unit connected to the first processor bus; a second processor bus; at least one digital signal processor connected to the second processor bus; an I/O bus providing for the connection of at least one I/O device to the digital processing system; a system memory; and a multi-port memory controller connected to the first processor bus, the second processor bus, the I/O bus and the system memory for managing transactions between the first and second processor buses, the I/O bus and the system memory. The memory controller provides the digital signal processor and central processing unit with equal and uniform access to the system memory and I/O devices connected to the I/O bus.

The described embodiment of the present invention utilizes an advanced dual-ported memory controller developed by NCR Corporation to connect the first, CPU, processor bus with the I/O bus and a first system memory. A second dual-ported memory controller connects the second, DSP, processor bus with the I/O bus and a second system memory. Utilizing Intel P6 bus technology, the NCR advanced memory controller, and other commodity components, a processing system configuration is created that supports up to four CPUs and four DSPs having equal and uniform access to all system resources.

The above and other objects, features, and advantages of the present invention will become apparent from the following description and the attached drawings.

BRIEF DESCRIPTION OF THE DRAWINGS

Other objects and advantages of the invention will become apparent from a study of the following specification when viewed in the light of the accompanying drawing, in which.

DETAILED DESCRIPTION OF THE PREFERRED EMBODIMENT

Figure 2:
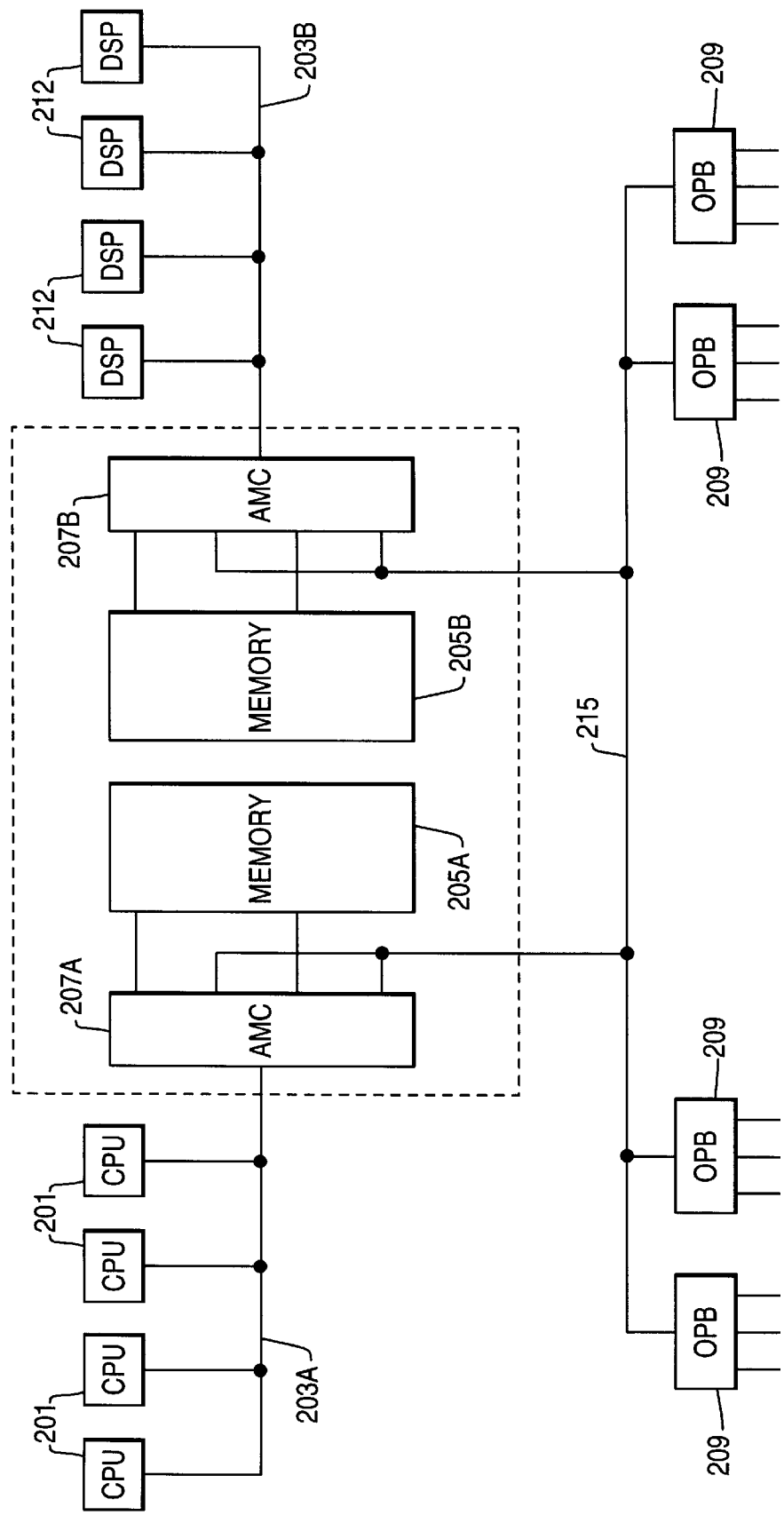
FIG. 2 is a simple block diagram representation of a digital signal processing system including multiple CPUs and multiple DSPs which provides the CPUs and DSPs with equal and uniform access to all system resources in accordance with the present invention.

Referring now to FIG. 2, an advanced digital processing SMP system including multiple CPUs and multiple DSPs having equal and uniform access to all system resources is shown. The system as shown includes up to four CPUs 201 connected to a high-bandwidth split-transaction processor bus 203A. A system memory 205A is connected to bus 203A through an advanced dual-ported memory controller 207A. The P6 processor bus 203A is connected to the first port of memory controller 207A. The second memory controller port connects to a second P6 I/O bus 215, also referred to herein as an expansion bus, which provides connection for multiple PCI I/O interfaces 209. All of these components, with the exception of advance memory controller 207, are currently available commodity components.

The system further includes up to four DSPs 212 connected to a second high-bandwidth split-transaction processor bus 203B. A second system memory 205B is connected to bus 203B through a second advanced dual-ported memory controller 207B. The processor bus 203B is connected to the first port of memory controller 207B. The second memory controller port connects to I/O or expansion bus 215, which as stated above provides connection for multiple PCI I/O interfaces 209.

The advanced memory controller (AMC) 207A and 207B manages control and data flow in all directions between their respective processor buses and I/O bus 215, as well as controlling access to system memories 205A and 205B. A more detailed discussion of the NCR Advanced Memory Controller and system architectures employing the NCR Advanced Memory Controller is provided in U.S. patent application Ser. No. 08/760,126, filed Dec. 3, 1996, titled "COMPUTER SYSTEM INCLUDING MULTIPLE SNOOPED, MULTIPLE MASTERED SYSTEM BUSSES AND METHOD FOR INTERCONNECTING SAID BUSSES," by Gene F. Young. U.S. patent application Ser. No. 08/760,126, assigned to NCR Corporation, is incorporated herein by reference.

Figure 1:
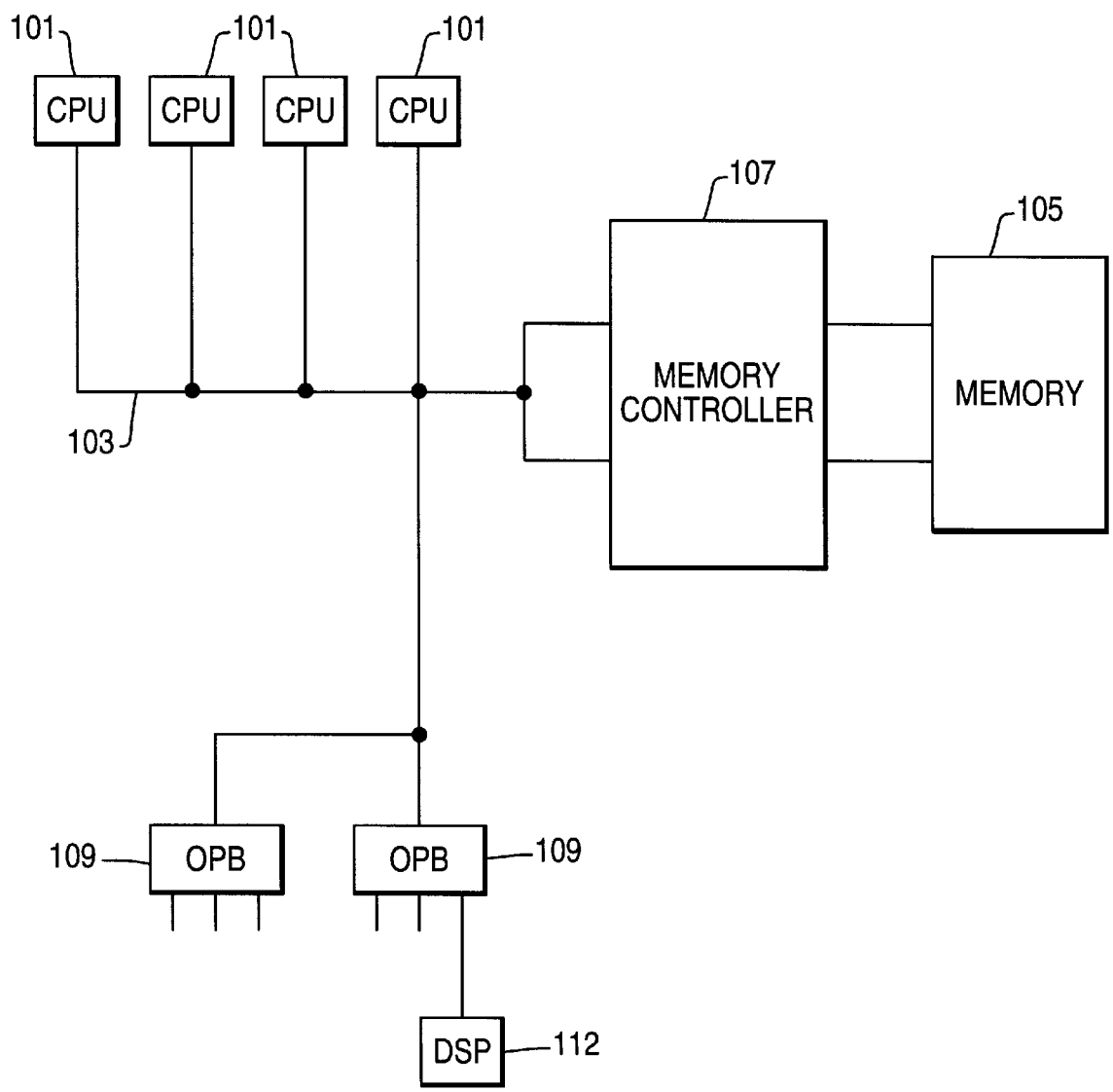
FIG. 1 is a simple block diagram representation of a multiple CPU symmetric multiprocessing (SMP) computer system including digital signal processors in a conventional arrangement wherein the digital signal processors are subservient to the computer system central processing units.

The architecture shown in FIG. 1 eliminates the restrictions on prior DSP configurations wherein the DSP is subservient to the system CPUs and system resource access is restricted and under very tight control of the system CPUs. More particularly, the architecture shown in FIG. 2 affords equal access to all memory and system resources to both the CPUs and DSPs. Accordingly, digital signal processing workloads do not have to be regulated by the system CPUs. Unnecessary and time consuming copies of functions are eliminated. Moreover, efficient data transport between signal processing and digital domains is afforded and multiple processors can operate concurrently.

It can thus be seen that there has been provided by the present invention a new arrangement for a computer system providing improved digital signal processing capabilities. The system includes a conventional central processor unit and a digital signal processor, each having equal and uniform access to all computer system resources.

Although a preferred embodiment of the invention has been illustrated and described, it will be apparent to those of ordinary skill in the art that various changes and modifications may be made without deviating from the inventive concepts set forth above. For example, the number of CPUs, DSPs, and processor busses may be varied. Memory controller chipsets other than the advanced dual-ported memory controller developed by NCR Corporation, such as products provided by Corollary, Inc. or Axil Computer, may be utilized to may be utilized to create a digital signal processing system configuration similar to that described above.

Although the presently preferred embodiment of the invention has been described, it will be understood that various changes may be made within the scope of the appended claims.

What is claimed is:

1. A digital processing system comprising:

a first processor bus;

at least one central processing unit connected to said first processor bus;

an I/O bus providing for the connection of at least one I/O device to said digital processing system;

a first system memory;

a first dual-ported memory controller connected to said first system memory, said first dual-ported memory controller having a first port connected to said first processor bus to manage transactions between said at least one central processor unit and said first system memory, and a second port connected to said I/O bus to manage transactions with said I/O bus;

a second processor bus;

at least one digital signal processor connected to said second processor bus;

a second system memory; and a second dual-ported memory controller connected to said second system memory, said second dual-ported memory controller having a first port connected to said second processor bus to manage transactions between said at least one digital signal processor and said second system memory, and a second port connected to said I/O bus to manage transactions with said I/O bus.

2. The digital system in accordance with claim 1, further comprising:

up to four central processor units connected to said first processor bus; and up to four digital signal processors connected to said second processor bus.

3. The digital processing system in accordance with claim 1, wherein:

each one of said central processor units comprises an Intel Pentium Pro processor.

4. The digital processing system in accordance with claim 1, wherein:

said first processor bus and said second processor bus comprise snooped busses.

5. The digital processing system in accordance with claim 1, wherein:

said first processor bus, said second processor bus and said I/O bus comprise Intel P6 busses.

6. A digital processing system comprising:

a first processor bus;

at least one central processing unit connected to said first processor bus;

a second processor bus;

at least one digital signal processor connected to said second processor bus;

an I/O bus providing for the connection of at least one I/O device to said digital processing system; and controller logic connected to said first processor bus, said second processor bus and said I/O bus for managing transactions between said first and second processor buses and said I/O bus, said controller logic providing said at least one digital signal processor and said at least one central processing unit with equal and uniform access to said at least one I/O device connected to said I/O bus.

7. A digital processing system comprising:

a first processor bus;

at least one central processing unit connected to said first processor bus;

a second processor bus;

at least one digital signal processor connected to said second processor bus;

an I/O bus providing for the connection of at least one I/O device to said digital processing system;

a system memory; and a multi-port memory controller connected to said first processor bus, said second processor bus, said I/O bus and said system memory for managing transactions between said first and second processor buses, said I/O bus and said system memory, said memory controller providing said at least one digital signal processor and said at least one central processing unit with equal and uniform access to said system memory and said at least one I/O device connected to said I/O bus.

* * * * *